(12) United States Patent
Wu et al.

(10) Patent No.: US 11,795,329 B2
(45) Date of Patent: Oct. 24, 2023

(54) BLACK TITANIUM DIOXIDE LIDAR REFLECTING PARTICLES AND VEHICLES COMPRISING THE SAME

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Kan Huang, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 430 days.

(21) Appl. No.: 17/093,737

(22) Filed: Nov. 10, 2020

(65) Prior Publication Data

US 2021/0139713 A1 May 13, 2021

Related U.S. Application Data

(60) Provisional application No. 62/934,307, filed on Nov. 12, 2019.

(51) Int. Cl.
 *C09D 5/33* (2006.01)
 *C09C 1/36* (2006.01)
 *G01S 7/481* (2006.01)

(52) U.S. Cl.
 CPC ............ *C09D 5/004* (2013.01); *C09C 1/3661* (2013.01); *G01S 7/481* (2013.01); *C01P 2004/03* (2013.01); *C01P 2004/62* (2013.01); *C01P 2004/64* (2013.01); *C01P 2004/86* (2013.01); *C01P 2006/40* (2013.01); *C01P 2006/60* (2013.01)

(58) Field of Classification Search
None
See application file for complete search history.

(56) References Cited

U.S. PATENT DOCUMENTS

2012/0118723 A1* 5/2012 Mao ............... B01J 37/0221
 977/773
2018/0120435 A1 5/2018 Decker et al.

FOREIGN PATENT DOCUMENTS

| CN | 103214032 B | 2/2015 |
|----|-------------|--------|
| CN | 105600820 B | 6/2017 |
| CN | 107601557 A | 1/2018 |
| WO | 2012075369 A1 | 6/2012 |

OTHER PUBLICATIONS

Yun Hang Hu, "A Highly Efficient Photocatalyst-Hydrogenated Black TiO2 for the Photocatalytic Splitting of Water" (https://onlinelibrary.wiley.com/doi/abs/10.1002/anie.201206375) Published: Nov. 4, 2012.

* cited by examiner

*Primary Examiner* — Alexandre F Ferre
(74) *Attorney, Agent, or Firm* — Dinsmore & Shohl LLP

(57) ABSTRACT

Black titanium dioxide has a crystalline titanium dioxide core and an amorphous titanium dioxide shell that encompasses the crystalline titanium dioxide core. The black titanium dioxide has a reflectivity of electromagnetic radiation in the visible spectrum that is less than or equal to 15% and a reflectivity for near-IR and LiDAR electromagnetic radiation that is greater than or equal to 10%. The black titanium dioxide has a band gap from greater than or equal to 1.0 eV to less than or equal to 2.0 eV.

19 Claims, 10 Drawing Sheets

BLACK TITANIUM DIOXIDE LIDAR REFLECTING PARTICLES AND VEHICLES COMPRISING THE SAME

TECHNICAL FIELD

The present specification generally relates to black titanium dioxide ($TiO_2$) particles and, more specifically, black $TiO_2$ particles that reflect near-IR electromagnetic radiation.

BACKGROUND

LiDAR systems using pulsed laser electromagnetic radiation with a wavelength of 905 nanometers have been proposed and tested for autonomous vehicle obstacle detection and avoidance systems. However, dark colored (e.g., black) pigments used in automotive paint to provide a dark colored vehicle absorb not only visible electromagnetic radiation to provide the dark color, but also absorbs near-IR electromagnetic radiation with a wavelength of 905 nanometers, which includes LiDAR electromagnetic radiation.

Accordingly, a need exists for alternative dark colored pigments that absorb electromagnetic radiation within the visible spectrum, but that reflect near-IR electromagnetic radiation with wavelengths around 905 nanometers.

SUMMARY

A first aspect includes black titanium dioxide comprising: a crystalline titanium dioxide core; and an amorphous titanium dioxide shell that encompasses the crystalline titanium dioxide core, wherein the black titanium dioxide has a reflectivity of electromagnetic radiation in the visible spectrum that is less than or equal to 15% and a reflectivity for near-IR and LiDAR electromagnetic radiation that is greater than or equal to 10%.

A second aspect includes the black titanium dioxide of the first aspect, wherein the black titanium dioxide has a reflectivity of electromagnetic radiation in the visible spectrum that is less than or equal to 5%.

A third aspect includes the black titanium dioxide of any one of the first to second aspects, wherein the black titanium dioxide has a reflectivity for near-IR and LiDAR electromagnetic radiation that is greater than or equal to 20%.

A fourth aspect includes the black titanium dioxide of any one of the first to third aspects, wherein the black titanium dioxide has a reflectivity for electromagnetic radiation in the visible spectrum that is from greater than or equal to 0.5% to less than or equal to 5%.

A fifth aspect includes the black titanium dioxide of any one of the first to fourth aspects, wherein the black titanium dioxide has a reflectivity for near-IR and LiDAR electromagnetic radiation that is from greater than or equal to 15% to less than or equal to 65%.

A sixth aspect includes the black titanium dioxide of any one of the first to fifth aspects, wherein the black titanium dioxide has a band gap from greater than or equal to 1.0 eV to less than or equal to 2.0 eV.

A seventh aspect includes the black titanium dioxide of any one of the first to sixth aspects, wherein the black titanium dioxide has a band gap from greater than or equal to 1.2 eV to less than or equal to 1.8 eV.

An eighth aspect includes black titanium dioxide particles comprising: a crystalline titanium dioxide core; and an amorphous titanium dioxide shell that encompasses the crystalline titanium dioxide core, wherein the black titanium dioxide particle has a band gap from greater than or equal to 1.0 eV to less than or equal to 2.0 eV.

A ninth aspect includes the black titanium dioxide particles of the eight aspect, wherein the black titanium dioxide particles have a band gap from greater than or equal to 1.2 eV to less than or equal to 1.8 eV.

A tenth aspect includes the black titanium dioxide particles of any one of the eighth to ninth aspects, wherein the amorphous titanium dioxide shell has a thickness less than or equal to 5.0 nm.

An eleventh aspect includes the black titanium dioxide particles of any one of the eighth to tenth aspects, wherein the amorphous titanium dioxide shell has a thickness less than or equal to 2.5 nm.

A twelfth aspect includes the black titanium dioxide particles of any one of the eighth to eleventh aspects, wherein the amorphous titanium dioxide shell has a thickness from greater than or equal to 0.1 nm to less than or equal to 5.0 nm.

A thirteenth aspect includes the black titanium dioxide particles of any one of the eighth to twelfth aspects, wherein the black titanium dioxide particles have an average particle size $D_{50}$ that is from greater than or equal to 5 nm to less than or equal to 200 nm.

A fourteenth aspect includes the black titanium dioxide particles of any one of the eighth to thirteenth aspects, wherein the black titanium dioxide particles have a reflectivity of electromagnetic radiation in the visible spectrum that is less than or equal to 15% and a reflectivity for near-IR and LiDAR electromagnetic radiation that is greater than or equal to 10%.

A fifteenth aspect includes the black titanium dioxide particles of any one of the eighth to fourteenth aspects, wherein the black titanium dioxide particles have a reflectivity of electromagnetic radiation in the visible spectrum that is less than or equal to 5% and a reflectivity for near-IR and LiDAR electromagnetic radiation that is greater than or equal to 20%.

A sixteenth aspect includes a paint comprising: a paint binder; black titanium dioxide comprising: a crystalline titanium dioxide core; and an amorphous titanium dioxide shell that encompasses the crystalline titanium dioxide core, wherein the black titanium dioxide has a reflectivity of electromagnetic radiation in the visible spectrum that is less than or equal to 15% and a reflectivity for near-IR and LiDAR electromagnetic radiation that is greater than or equal to 10%, wherein the LiDAR reflecting dark colored paint has a color with a lightness in CIELAB color space less than or equal to 40.

A seventeenth aspect includes the paint of the sixteenth aspect, wherein the black titanium dioxide has a band gap from greater than or equal to 1.0 eV to less than or equal to 2.0 eV.

An eighteenth aspect includes the paint of any one of the sixteenth to seventeenth aspects, wherein the amorphous titanium dioxide shell has a thickness less than or equal to 5 nm.

A nineteenth aspect includes a vehicle comprising: a body panel coated in a LiDAR reflecting dark colored paint, the LiDAR reflecting dark colored paint comprising: a paint binder; black titanium dioxide comprising: a crystalline titanium dioxide core; and an amorphous titanium dioxide shell that encompasses the crystalline titanium dioxide core, wherein the black titanium dioxide has a reflectivity of electromagnetic radiation in the visible spectrum that is less than or equal to 15% and a reflectivity for near-IR and LiDAR electromagnetic radiation that is greater than or equal to 10%, wherein the LiDAR reflecting dark colored paint has a color with a lightness in CIELAB color space less than or equal to 40.

A twentieth aspect includes the vehicle of the nineteenth aspect, wherein black titanium dioxide has a band gap from greater than or equal to 1.0 eV to less than or equal to 2.0 eV.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, black titanium dioxide comprises: a crystalline titanium dioxide core; and an amorphous titanium dioxide shell that encompasses the crystalline titanium dioxide core, wherein the black titanium dioxide has a reflectivity of electromagnetic radiation in the visible spectrum that is less than or equal to 15% and a reflectivity for near-IR and LiDAR electromagnetic radiation that is greater than or equal to 10%. Accordingly, LiDAR reflective black $TiO_2$ particles disclosed and described herein display a dark color and reflect near-IR electromagnetic radiation, which includes LiDAR, with wavelengths between and including 850 nm and 1550 nm. In embodiments, the black $TiO_2$ particles disclosed and described herein can be included in a paint system to form a LiDAR reflecting dark colored paint that can be applied to objects, such as, for examples, portions of a vehicle, so that LiDAR systems can detect an article coated with the LiDAR reflecting dark colored paint.

As used herein, the term "near-IR electromagnetic radiation" refers to electromagnetic radiation with wavelengths between and including 750 nm and 950 nm, and LiDAR refers to electromagnetic radiation with wavelengths between and including 905 nm to 1550 nm.

As used herein, the term "visible spectrum" refers to electromagnetic radiation with wavelengths between and including 350 nm and 750 nm.

The LiDAR reflecting dark colored paint may be disposed on surfaces to provide a LiDAR reflecting dark colored surface. Non-limiting examples include surfaces of vehicle body panels such as vehicle door panels, vehicle quarter panels, and the like. Utilization of the LiDAR reflecting black $TiO_2$ particles allows dark colored vehicles to be detected with a LiDAR system. Various embodiments of LiDAR reflecting black $TiO_2$ and methods for using the same will be described in further detail herein with specific reference to the appended drawings.

One difficulty in forming dark-colored (such as black) particles and paint systems that reflect LiDAR or near-IR electromagnetic radiation is the close proximity of the visible spectrum of electromagnetic radiation and near-IR electromagnetic radiation or LiDAR. Materials that provide a dark color, such as black, do not reflect electromagnetic radiation within the visible spectrum of electromagnetic radiation. Such materials will generally also not reflect electromagnetic radiation just outside of the visible spectrum of electromagnetic radiation, such as near-IR and LiDAR. Accordingly, a material that does not reflect electromagnetic radiation within the visible spectrum but does reflect near-IR or LiDAR electromagnetic radiation is required to have a very sharp increase in reflectivity just outside of the visible spectrum of electromagnetic radiation.

Figure 1A:
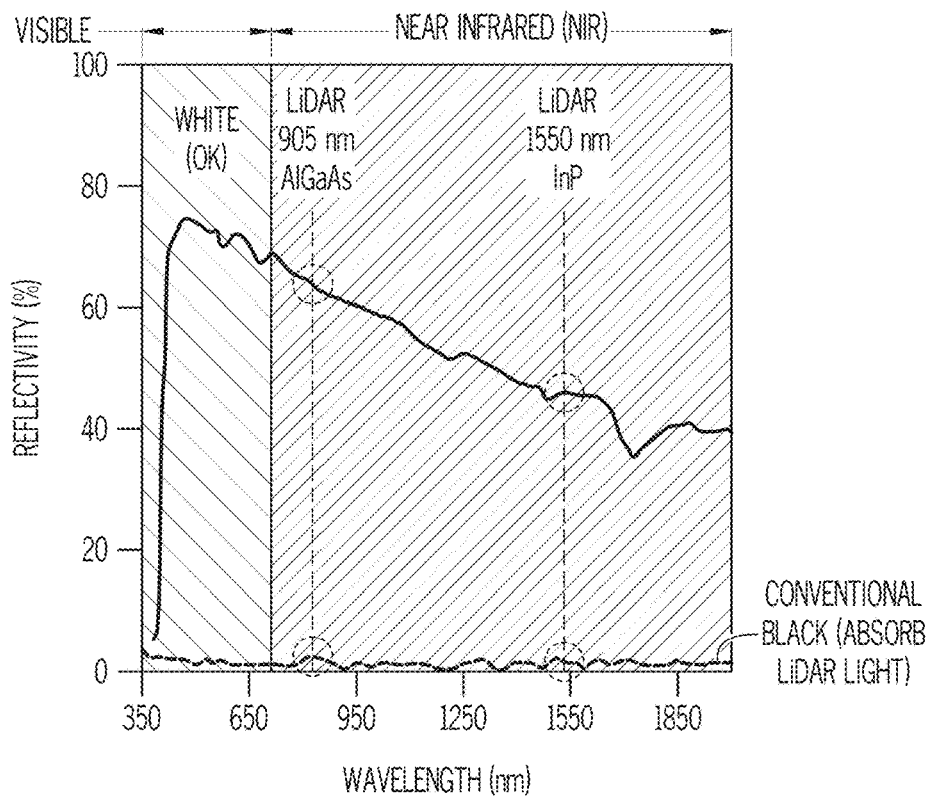
FIG. 1A graphically depicts the reflectivity versus wavelength of electromagnetic radiation for conventional colorants.

With reference now to FIG. 1A, the reflectivity of materials that are commonly used as colorants in a paint system. The percentage of reflectivity is measured via Perkin Elmer Lambda 1050 UV-Vis NIR spectrometer. The percentage of reflectivity is presented along the y-axis of FIG. 1A and the wavelength of the electromagnetic radiation is provided along the x-axis of FIG. 1A. Along the bottom of the graph is shown the reflectivity of a conventional black colorant, such as carbon black. As shown in FIG. 1A, the carbon black colorant does not reflect electromagnetic radiation in the visible spectrum (to the left of the graph). As shown in FIG. 1A, the reflection of this black colorant is near zero percent within the visible spectrum of electromagnetic radiation. This indicates that the colorant provides a dark nearly pure black color. However, these conventional colorants also reflect around zero percent of electromagnetic radiation outside of the visible spectrum (to the right on the graph), such as in the near-IR electromagnetic radiation or LiDAR electromagnetic radiation (e.g., from about 905 nanometers (nm) to about 1050 nm). Similarly, near the top of the graph is shown the reflectivity of white $TiO_2$, which is used as a conventional white colorant. As shown in FIG. 1A, white $TiO_2$ reflects near-IR and LiDAR electromagnetic radiation as shown on the right side of the graph (e.g., from about 905 nm to 1050 nm) where the reflection of near-IR and LiDAR electromagnetic radiation is greater than forty percent (at 1550 nm), and around sixty percent (at 905 nm). However, white $TiO_2$, as the name indicates, also reflects electromagnetic radiation within the visible spectrum. As shown in FIG. 1A, white $TiO_2$ reflects nearly eighty percent of electromagnetic radiation within the visible spectrum. Accordingly, neither of these colorants are suitable as a dark-colored particle that also reflects near-IR or LiDAR electromagnetic radiation.

Figure 1B:
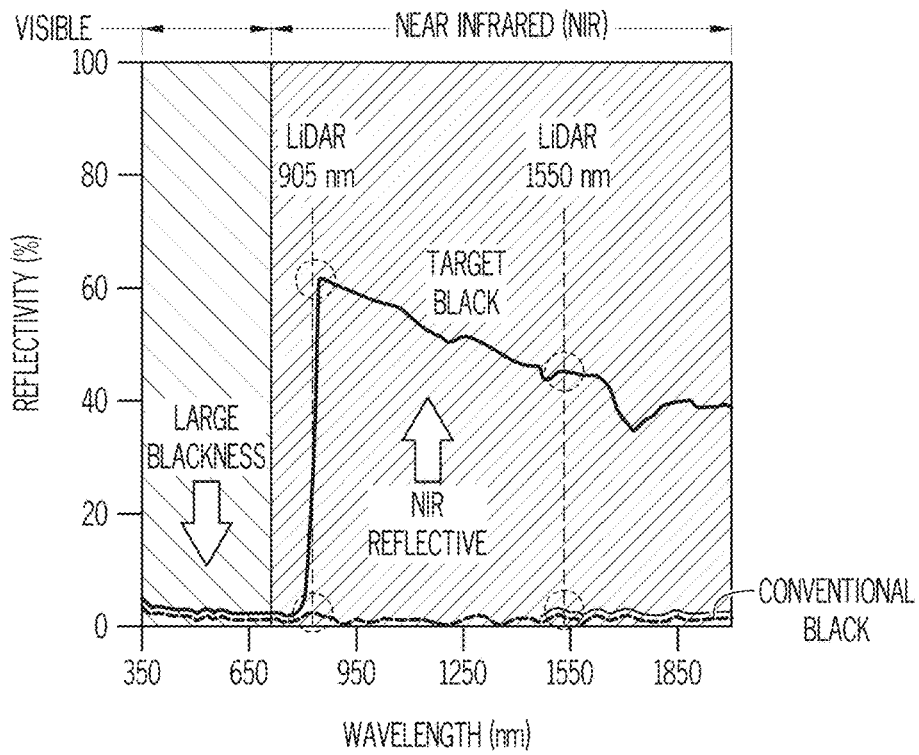
FIG. 1B graphically depicts the reflectivity versus wavelength of electromagnetic radiation for colorants according to embodiments disclosed and described herein.

FIG. 1B is a graph showing the target conditions of a particle that does not reflect light in the visible spectrum of electromagnetic radiation, but that does reflect near-IR and LiDAR electromagnetic radiation. It should be understood that FIG. 1B shows the theoretical reflectance of a material that does not reflect light in the visible spectrum, but that does reflect near-IR and LiDAR electromagnetic radiation. Like FIG. 1A, the percentage of reflectivity is measured along the y-axis and the wavelength of electromagnetic radiation is provided along the x-axis. Along the bottom of the graph is shown the reflectivity of a conventional black colorant, which is identical to the reflectivity of the conventional black colorant shown in FIG. 1A. As shown in FIG. 1B, particles that do not reflect electromagnetic within the visible spectrum and that reflect near-IR and LiDAR electromagnetic radiation have at least two distinct regions of reflection. The first region of reflection is within the visible spectrum of electromagnetic radiation, indicated as "1" on the left side of the graph in FIG. 1B. In this region of reflection, particles that do not reflect electromagnetic within the visible spectrum and that reflect near-IR and LiDAR electromagnetic radiation will behave the same as conventional black colorants (such as carbon black) by not reflecting electromagnetic radiation within the visible spectrum. As shown in FIG. 1B, particles that do not reflect electromagnetic within the visible spectrum and that reflect near-IR and LiDAR electromagnetic radiation reflect nearly zero percent of electromagnetic radiation within the visible spectrum. However, particles that do not reflect electromagnetic within the visible spectrum and that reflect near-IR and LiDAR electromagnetic radiation have a second region of reflection that is outside of the visible spectrum of electromagnetic radiation.

The second region of reflection encompasses electromagnetic radiation with wavelengths including and between 750 nm and 1050 nm (which includes near-IR and LiDAR electromagnetic radiation). In the second region of reflection, the particles that do not reflect electromagnetic within the visible spectrum and that reflect near-IR and LiDAR electromagnetic radiation perform similarly as white $TiO_2$ by reflecting a high amount of electromagnetic radiation within the second region of reflection. As shown in FIG. 1B, particles that do not reflect electromagnetic within the visible spectrum and that reflect near-IR and LiDAR electromagnetic radiation reflect, for example, about sixty percent of LiDAR electromagnetic radiation having a wavelength of 905 nm and reflects greater than forty percent of LiDAR electromagnetic radiation having a wavelength of 1550 nm. By having reflectance in the second region of reflection that is similar to white $TiO_2$, particles can reflect a sufficient amount of near-IR and LiDAR electromagnetic radiation that the particles can be detected by LiDAR systems.

The theoretical reflection of black near-IR and LiDAR electromagnetic radiation reflecting pigments shown in FIG. 1B indicates the difficulty in forming particles that do not reflect electromagnetic within the visible spectrum and that reflect near-IR and LiDAR electromagnetic radiation. Particularly, FIG. 1B shows a steep increase in reflectance just outside of the visible spectrum of electromagnetic radiation. In embodiments, this steep increase of reflectance is present at a wavelength of electromagnetic radiation that is at or about 905 nm, which is a wavelength of electromagnetic radiation commonly used in LiDAR systems. As shown in FIG. 1B, the reflectance increases from about zero percent to nearly sixty percent at a wavelength of electromagnetic radiation that is about 905 nm. Forming a particle with such a precise and steep increase in reflectance is difficult to achieve and there is very little room for error. For instance, if the material reflects too much electromagnetic radiation within the visible spectrum, the appearance of the color will not be pure black, but will have hints of, for example, red or purple. However, if the material does not reflect a sufficient amount of near-IR or LiDAR electromagnetic radiation, the material will not be suitable for detection by LiDAR systems.

Figure 2:
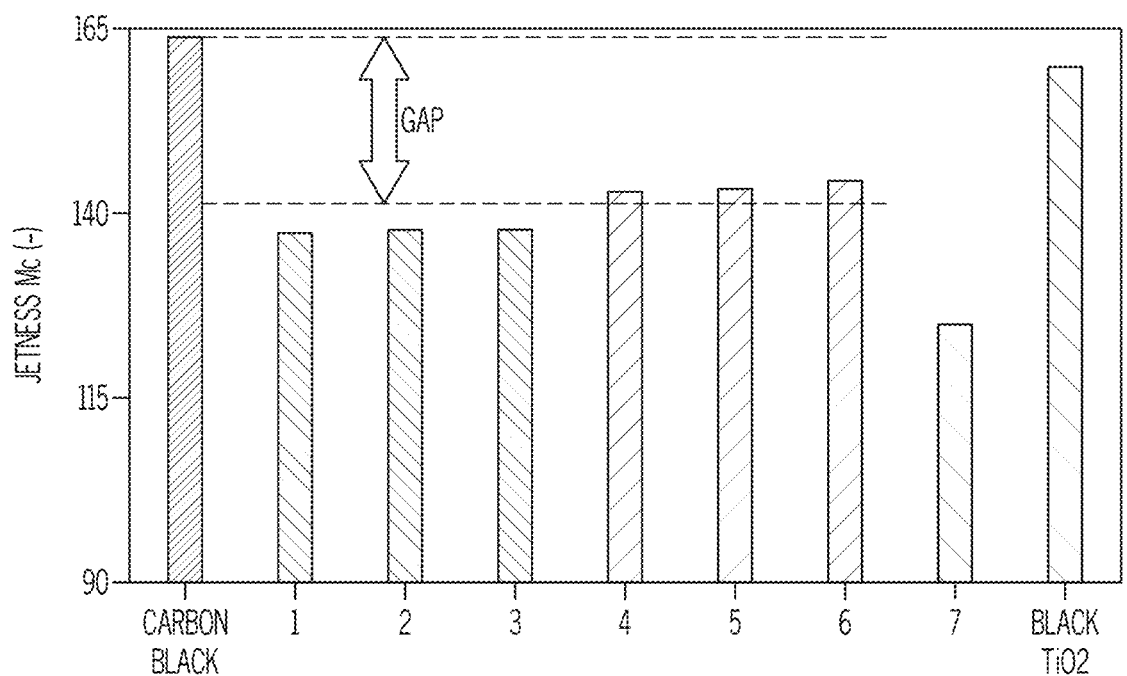
FIG. 2 is a bar graph depicting the jetness of commercially available materials and black $TiO_2$ according to embodiments disclosed and described herein.

Some materials do not reflect electromagnetic radiation within much of the visible spectrum and reflect near-IR and LiDAR electromagnetic radiation; however, these materials have not been able to reproduce the visible appearance of carbon black (i.e., has a reflectivity of about zero percent for electromagnetic radiation within the visible spectrum). One such material that has gained interest is a class of complex inorganic pigments (CIP) based on mixed metal oxides such as chromium iron oxides, chromium green-black hematite, chromium iron nickel black thereof. Although CIP materials can generally reflect near-IR and LiDAR electromagnetic radiation, colorants made from CIP materials are generally referred to as "cool black" because colorants made from CIP or derivatives thereof have hints of red or blue in them. FIG. 2 is a bar graph that shows the jetness of various materials on the y-axis. Jetness is measured by X-Rite Spectrophotometer. At the far left of FIG. 2 is carbon black, which is the material commonly used as a black colorant, but does not reflect near-IR or LiDAR electromagnetic radiation. As shown in FIG. 2, carbon black has a jetness of about 165. Materials 1-7 are one typical CIP containing materials that reflect near-IR and LiDAR electromagnetic radiation, but as can be seen in FIG. 2, these materials have a jetness that is around 142 or less. This difference in jetness is notable, as materials 1-7 have tints of red or blue. Thus, this considerable gap in jetness between carbon black and materials 1-7 show that materials 1-7 are generally not suitable to be used in applications where pure black is desired, such as, for example, in paint for automotive applications.

Black $TiO_2$ is another material that has been considered for use as a black colorant. As shown in FIG. 2, black $TiO_2$ has a jetness that approaches 165, which is comparable to the jetness of carbon black. Black $TiO_2$ generally does not show tints of red and brown, and is a good substitute for carbon black. However, standard black $TiO_2$ does not reflect near-IR or LiDAR electromagnetic radiation. Moreover, black $TiO_2$ is more expensive to prepare than carbon black because, as presented in more detail below, $TiO_2$ naturally has a white color and must be treated, such as, for example, through hydrogenation, to form black $TiO_2$. White $TiO_2$ reflects near-IR and LiDAR electromagnetic radiation, but when it is treated to become black $TiO_2$ it loses its ability to reflect near-IR and LiDAR electromagnetic radiation. Accordingly, although black $TiO_2$ is visibly similar to carbon black in terms of its jetness, carbon black is generally preferred over black $TiO_2$ for economic reasons. However, according to embodiments disclosed and described herein, white $TiO_2$ may theoretically be converted to black $TiO_2$ that does not electromagnetic radiation within the visible spectrum and reflects near-IR and LiDAR electromagnetic radiation. TiO$_2$ is a widely used oxide material. It has attracted considerable interest in the fields of catalysis, solar cells, energy storage, and semiconductor devices. It is also used as white pigment materials due to its relatively wide bandgap (3.0 eV for rutile phase TiO$_2$ and 3.2 eV for anatase phase TiO$_2$). As a photocatalyst, the photo-conversion efficiency of TiO$_2$ is limited by its large band gap properties. These wide band gap properties limit the light absorption of TiO$_2$ in ultraviolet (UV) electromagnetic radiation and electromagnetic radiation with lower wavelengths than UV. Therefore, much effort has been made to enhance the visible and infrared light absorption of TiO$_2$ by band engineering including hydrogenation and metal or non-metal doping. As for photocatalyst application, high absorption in both IR and visible spectra is desired. Thus, in previous uses of black TiO$_2$, it was desired for the TiO$_2$ to absorb near-IR and LiDAR electromagnetic radiation. It was not previously appreciated that black TiO$_2$ could be used to reflect near-IR and LiDAR electromagnetic radiation.

As noted above with reference to FIG. 2, white TiO$_2$ can be treated to turn to a dark color that has a jetness that approaches the jetness of carbon black. Among these treatments, hydrogenation of white TiO$_2$ is an exemplary treatment that can be used to turn white TiO$_2$ to black TiO$_2$. It has been found that as hydrogenation proceeds, the defect band of TiO$_2$ rises to be near the valence band while the conduction band of TiO$_2$ remains almost unchanged. This provides a band gap that is believed to be close to 1.8 eV. By exploiting the stability of the conduction band of TiO$_2$ and the instability of the defect band of TiO$_2$, it is believed that the band gap of TiO$_2$ can be controlled to provide unique and desired properties of the TiO$_2$.

The band gap generally refers to the energy difference (in electron volts or eV) between the top of the valence band (VB) and the bottom of the conduction band (CB). The band gap is the energy required for an electron to move from the valence band to the conduction band. In optics, the band gap correlates to the threshold where photons can be absorbed by a material. Therefore, the band gap determines what portion of the electromagnetic spectrum the material can absorb. Generally, a material with a large band gap will absorb a greater portion of electromagnetic spectra having a short wavelength and a material with a small band gap will absorb a greater portion of electromagnetic spectra having long wavelengths. However, it has been found that by manipulating the band gap of a material, the types of electromagnetic spectra that are absorbed by the material may be controlled. TiO$_2$ is a material that is particularly amenable to band gap manipulation, as discussed in more detail below.

Figure 3:
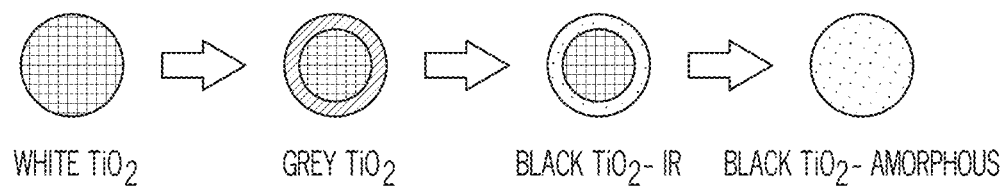
FIG. 3 schematically depicts the development of black $TiO_2$ during hydrogenation, and the band gaps for each step of development.
Figure 3:
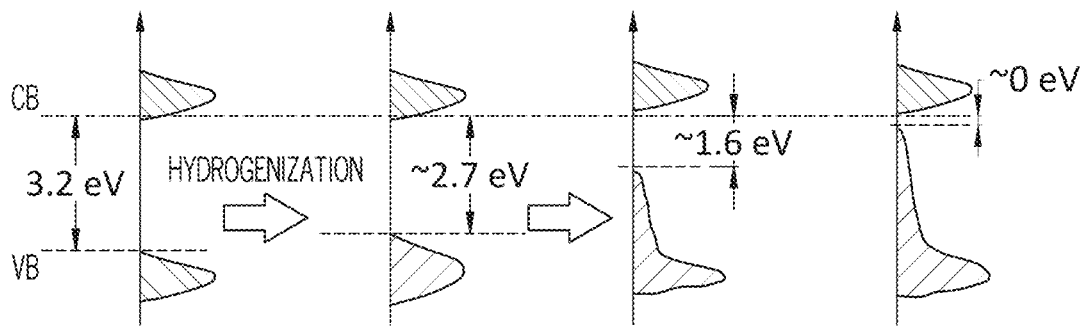

With reference now to FIG. 3, white TiO$_2$ that has a relatively pure crystalline structure is widely available. White, crystalline TiO$_2$ has a band gap of about 3.2 eV and has a high reflectivity of electromagnetic radiation in the visible spectrum as well as a high reflectivity of near-IR and LiDAR electromagnetic radiation (as shown in FIG. 1A). However, it has been found that the valence band of TiO$_2$ may be manipulated through various methods, such as, for example, hydrogenation. As hydrogenation proceeds, the crystalline structure of TiO$_2$ is altered, and a disordered shell begins to be formed on the surface of the TiO$_2$ particle, forming a crystalline-amorphous core-shell black TiO$_2$. The formation of this disordered shell on the TiO$_2$ particle alters the valence band while the conduction band remains constant. As the amorphous phase begins to be formed on the surface of the TiO$_2$ particle, the TiO$_2$ will transition from a white color to a grey color, and the alteration of the valence band reduces the band gap. As shown in FIG. 3, grey TiO$_2$ reflects less electromagnetic radiation in the visible spectrum than white TiO$_2$ and still reflects near-IR and LiDAR electromagnetic radiation. However, grey TiO$_2$ still reflects a significant amount of electromagnetic radiation in the visible spectrum, and is not suitable for applications where a pure black color is desired.

As the hydrogenation continues, the amorphous shell is more thoroughly formed on the surface of the TiO$_2$ particle such that a lattice disorder is formed at the surface by H-doping, introducing electronic states forming valence band shifting, which consequently narrowed the bandgap to about half of the original bandgap. It was observed that there are no other defects, such as oxygen vacancy or Ti$^{3+}$ in the disordered shell. It is hypothesized that in this structure, electromagnetic radiation in the visible spectrum is not reflected (i.e., is absorbed), but near-IR and LiDAR electromagnetic radiation is reflected due to reduced band gap. In this way, TiO$_2$ particles having an amorphous TiO$_2$ shell and a crystalline TiO$_2$ core would not reflect electromagnetic radiation within the visible spectrum and would reflect near-IR and LiDAR electromagnetic radiation.

However, if the hydrogenation of the TiO$_2$ particle is not properly controlled, the entire TiO$_2$ particle will become amorphous TiO$_2$, as shown in FIG. 3. In this state, significant amount of oxygen vacancy and Ti$^{3+}$ can be observed, and the band gap of the TiO$_2$ particle is essentially zero, and the amorphous TiO$_2$ particle does reflect electromagnetic radiation in the visible spectrum or near-IR and LiDAR electromagnetic radiation. Previously, the amorphous black TiO$_2$ was the desired product, and treatments would bypass the stage where TiO$_2$ particles have a well-formed amorphous TiO$_2$ shell and a crystalline TiO$_2$ core. The unique properties of TiO$_2$ particles that have a well-formed disordered shell and a crystalline TiO$_2$ core were not appreciated. Indeed, it is difficult to control the hydrogenation process in such a way that TiO$_2$ particles that have a well-formed disordered TiO$_2$ shell and a crystalline TiO$_2$ core are achieved.

According to embodiments disclosed and described herein, TiO$_2$ particles comprise a crystalline TiO$_2$ core and a disordered TiO$_2$ shell. In one or more embodiments, the disordered TiO$_2$ shell has a thickness of less than or equal to 5.0 nm, such as less than or equal to 4.5 nm, less than or equal to 4.0 nm, less than or equal to 3.5 nm, less than or equal to 3.0 nm, less than or equal to 2.5 nm, less than or equal to 2.0 nm, less than or equal to 1.5 nm, less than or equal to 1.0 nm, or less than or equal to 0.5 nm. In one or more embodiments, the disordered TiO$_2$ shell has a thickness from greater than or equal to 0.1 nm to less than or equal to 5.0 nm, such as from greater than or equal to 0.5 nm to less than or equal to 5.0 nm, from greater than or equal to 1.0 nm to less than or equal to 5.0 nm, from greater than or equal to 1.5 nm to less than or equal to 5.0 nm, from greater than or equal to 2.0 nm to less than or equal to 5.0 nm, from greater than or equal to 2.5 nm to less than or equal to 5.0 nm, from greater than or equal to 3.0 nm to less than or equal to 5.0 nm, from greater than or equal to 3.5 nm to less than or equal to 5.0 nm, from greater than or equal to 4.0 nm to less than or equal to 5.0 nm, or from greater than or equal to 4.5 nm to less than or equal to 5.0 nm. In one or more embodiments, the disordered TiO$_2$ shell has a thickness from greater than or equal to 0.1 nm to less than or equal to 5.0 nm, such as from greater than or equal to 0.1 nm to less than or equal to 4.5 nm, from greater than or equal to 0.1 nm to less than or equal to 4.0 nm, from greater than or equal to 0.1 nm to less than or equal to 3.5 nm, from greater than or equal to 0.1 nm to less than or equal to 3.0 nm, from greater than or equal to 0.1 nm to less than or equal to 2.5 nm, from greater than or equal to 0.1 nm to less than or equal to 2.0 nm, from greater than or equal to 0.1 nm to less than or equal to 1.5 nm, from greater than or equal to 0.1 nm to less than or equal to 1.0 nm, or from greater than or equal to 0.1 nm to less than or equal to 0.5 nm. In one or more embodiments, the disordered $TiO_2$ shell has a thickness from greater than or equal to 0.1 nm to less than or equal to 5.0 nm, such as from greater than or equal to 0.5 nm to less than or equal to 4.5 nm, from greater than or equal to 1.0 nm to less than or equal to 4.0 nm, from greater than or equal to 1.5 nm to less than or equal to 3.5 nm, from greater than or equal to 2.0 nm to less than or equal to 3.0 nm, or from greater than or equal to 2.5 nm to less than or equal to 3.0 nm.

The overall particle size of the $TiO_2$ particle is not particularly limited. However, in one or more embodiments, the $TiO_2$ particles have an average particle size $D_{50}$ from greater than or equal to 5 nm to less than or equal to 200 nm, such as from greater than or equal to 20 nm to less than or equal to 180 nm, from greater than or equal to 40 nm to less than or equal to 200 nm, from greater than or equal to 60 nm to less than or equal to 200 nm, from greater than or equal to 80 nm to less than or equal to 200 nm, from greater than or equal to 100 nm to less than or equal to 200 nm, from greater than or equal to 120 nm to less than or equal to 200 nm, from greater than or equal to 140 nm to less than or equal to 200 nm, from greater than or equal to 160 nm to less than or equal to 200 nm, or from greater than or equal to 180 nm to less than or equal to 200 nm. In one or more embodiments, the $TiO_2$ particles have an average particle size $D_{50}$ from greater than or equal to 10 nm to less than or equal to 180 nm, such as from greater than or equal to 10 nm to less than or equal to 160 nm, from greater than or equal to 10 nm to less than or equal to 140 nm, from greater than or equal to 10 nm to less than or equal to 120 nm, from greater than or equal to 10 nm to less than or equal to 100 nm, from greater than or equal to 10 nm to less than or equal to 80 nm, from greater than or equal to 10 nm to less than or equal to 60 nm, from greater than or equal to 10 nm to less than or equal to 40 nm, or from greater than or equal to 10 nm to less than or equal to 20 nm. In one or more embodiments, the $TiO_2$ particles have an average particle size $D_{50}$ from greater than or equal to 20 nm to less than or equal to 180 nm, such as from greater than or equal to 40 nm to less than or equal to 160 nm, from greater than or equal to 60 nm to less than or equal to 140 nm, or from greater than or equal to 80 nm to less than or equal to 120 nm.

As described herein, by controlling the hydrogenation process, the band gap of the $TiO_2$ particles having a disordered $TiO_2$ shell and a crystalline $TiO_2$ core effects the reflectivity of electromagnetic radiation. Accordingly, in one or more embodiments, the targeted band gap for $TiO_2$ particles having an disordered $TiO_2$ shell and a crystalline $TiO_2$ core as measured by UV-Vis-NIR spectrometer is from greater than or equal to 1.0 eV to less than or equal to 2.0 eV, such as from greater than or equal to 1.1 eV to less than or equal to 2.0 eV, from greater than or equal to 1.2 eV to less than or equal to 2.0 eV, from greater than or equal to 1.3 eV to less than or equal to 2.0 eV, from greater than or equal to 1.4 eV to less than or equal to 2.0 eV, from greater than or equal to 1.5 eV to less than or equal to 2.0 eV, from greater than or equal to 1.6 eV to less than or equal to 2.0 eV, or from greater than or equal to 1.7 eV to less than or equal to 2.0 eV. In one or more embodiments, the targeted band gap of $TiO_2$ particles having an disordered $TiO_2$ shell and a crystalline $TiO_2$ core is from greater than or equal to 1.0 eV to less than 1.8 eV, from greater than or equal to 1.0 eV to less than or equal to 1.7 eV, from greater than or equal to 1.0 eV to less than or equal to 1.6 eV, from greater than or equal to 1.0 eV to less than or equal to 1.5 eV, from greater than or equal to 1.0 eV to less than or equal to 1.4 eV, from greater than or equal to 1.0 eV to less than or equal to 1.3 eV, from greater than or equal to 1.0 eV to less than or equal to 1.2 eV, or from greater than or equal to 1.0 eV to less than or equal to 1.1 eV. In one or more embodiments, the targeted band gap of $TiO_2$ particles having an disordered $TiO_2$ shell and a crystalline $TiO_2$ core is from greater than or equal to 1.1 eV to less than or equal to 1.9 eV, such as from greater than or equal to 1.2 eV to less than or equal to 1.8 eV, from greater than or equal to 1.3 eV to less than or equal to 1.7 eV, from greater than or equal to 1.4 eV to less than or equal to 1.6 eV, or about 1.5 eV.

$TiO_2$ particles according to embodiments disclosed and described herein have a targeted reflectivity for electromagnetic radiation in the visible spectrum that is less than or equal to 15%, as measured via UV-Vis-NIR spectrophotometer such as less than or equal to 14%, less than or equal to 13%, less than or equal to 12%, less than or equal to 11%, less than or equal to 10%, less than or equal to 9%, less than or equal to 8%, less than or equal to 7%, less than or equal to 6%, less than or equal to 5%, less than or equal to 4%, less than or equal to 3%, less than or equal to 2%, or less than or equal to 1%. In one or more embodiments, the $TiO_2$ particles have a targeted reflectivity for electromagnetic radiation in the visible spectrum that is from greater than or equal to 0.5% to less than or equal to 15%, such as from greater than or equal to 0.5% to less than or equal to 14%, from greater than or equal to 0.5% to less than or equal to 13%, from greater than or equal to 0.5% to less than or equal to 12%, from greater than or equal to 0.5% to less than or equal to 11%, from greater than or equal to 0.5% to less than or equal to 10%, from greater than or equal to 0.5% to less than or equal to 9%, from greater than or equal to 0.5% to less than or equal to 8%, from greater than or equal to 0.5% to less than or equal to 7%, from greater than or equal to 0.5% to less than or equal to 6%, from greater than or equal to 0.5% to less than or equal to 5%, from greater than or equal to 0.5% to less than or equal to 4%, from greater than or equal to 0.5% to less than or equal to 3%, from greater than or equal to 0.5% to less than or equal to 2%, or from greater than or equal to 0.5% to less than or equal to 1%.

$TiO_2$ particles according to embodiments disclosed and described herein have a targeted reflectivity for near-IR and LiDAR electromagnetic radiation that is greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 60%, or greater than or equal to 65%. In one or more embodiments, the $TiO_2$ particles have a targeted reflectivity for near-IR and LiDAR electromagnetic radiation that is from greater than or equal to 10% to less than or equal to 65%, such as from greater than or equal to 10% to less than or equal to 60%, from greater than or equal to 10% to less than or equal to 55%, from greater than or equal to 10% to less than or equal to 50%, from greater than or equal to 10% to less than or equal to 45%, from greater than or equal to 10% to less than or equal to 40%, from greater than or equal to 10% to less than or equal to 35%, from greater than or equal to 10% to less than or equal to 30%, from greater than or equal to 10% to less than or equal to 25%, from greater than or equal to 10% to less than or equal to 20%, or from greater than or equal to 10% to less than or equal to 15%.

Methods for forming black $TiO_2$ according to embodiments disclosed and described herein will now be described. Generally, hydrogenation treatments are performed by exposing white $TiO_2$ to a hydrogen ($H_2$) gas atmosphere at high temperature and pressure for an extended period of time. However, if the temperature and pressure are not properly balanced, black $TiO_2$ particles with a disordered $TiO_2$ shell and a crystalline $TiO_2$ core will not be formed. As used herein, the term "disordered $TiO_2$" and like terms refer to $TiO_2$ that does not have an ordered crystalline structure and may comprise amorphous $TiO_2$. However, if the proper balance of time, temperature, and pressure are not achieved an entirely disordered $TiO_2$ particle or a $TiO_2$ particle having a shell of disorder and crystalline $TiO_2$ will be formed.

According to embodiments, the methods for forming black $TiO_2$ particles with an disordered $TiO_2$ shell and a crystalline $TiO_2$ core comprises exposing white $TiO_2$ to a hydrogen atmosphere in gas phase (e.g., greater than 99% $H_2$) at temperatures from greater than or equal to 200° C. to less than or equal to 600° C. at pressures from greater than or equal to 20 bar to less than or equal to 90 bar, and for durations from greater than or equal to 12 hours to less than or equal to 10 days.

In one or more embodiments, the temperature is from greater than or equal to 200° C. to less than or equal to 600° C., such as from greater than or equal to 200° C. to less than or equal to 575° C., from greater than or equal to 200° C. to less than or equal to 550° C., from greater than or equal to 200° C. to less than or equal to 525° C., from greater than or equal to 200° C. to less than or equal to 500° C., from greater than or equal to 200° C. to less than or equal to 475° C., from greater than or equal to 200° C. to less than or equal to 450° C., from greater than or equal to 200° C. to less than or equal to 425° C., from greater than or equal to 200° C. to less than or equal to 400° C., from greater than or equal to 200° C. to less than or equal to 375° C., from greater than or equal to 200° C. to less than or equal to 350° C., from greater than or equal to 200° C. to less than or equal to 325° C., from greater than or equal to 200° C. to less than or equal to 300° C., from greater than or equal to 200° C. to less than or equal to 275° C., from greater than or equal to 200° C. to less than or equal to 250° C., or from greater than or equal to 200° C. to less than or equal to 225° C. In one or more embodiments, the temperature is from greater than or equal to 225° C. to less than or equal to 600° C., from greater than or equal to 250° C. to less than or equal to 600° C., from greater than or equal to 275° C. to less than or equal to 600° C., from greater than or equal to 300° C. to less than or equal to 600° C., from greater than or equal to 325° C. to less than or equal to 600° C., from greater than or equal to 350° C. to less than or equal to 600° C., from greater than or equal to 375° C. to less than or equal to 600° C., from greater than or equal to 400° C. to less than or equal to 600° C., from greater than or equal to 425° C. to less than or equal to 600° C., from greater than or equal to 450° C. to less than or equal to 600° C., from greater than or equal to 475° C. to less than or equal to 600° C., from greater than or equal to 500° C. to less than or equal to 600° C., from greater than or equal to 525° C. to less than or equal to 600° C., from greater than or equal to 550° C. to less than or equal to 600° C., or from greater than or equal to 575° C. to less than or equal to 600° C. In one or more embodiments, the temperature is from greater than or equal to 225° C. to less than or equal to 575° C., such as from greater than or equal to 250° C. to less than or equal to 550° C., from greater than or equal to 275° C. to less than or equal to 525° C., from greater than or equal to 300° C. to less than or equal to 500° C., from greater than or equal to 325° C. to less than or equal to 475° C., from greater than or equal to 350° C. to less than or equal to 450° C., or from greater than or equal to 375° C. to less than or equal to 425° C.

In one or more embodiments, the pressure is from greater than or equal to 20 bar to less than or equal to 90 bar, such as from greater than or equal to 25 bar to less than or equal to 90 bar, from greater than or equal to 30 bar to less than or equal to 90 bar, from greater than or equal to 35 bar to less than or equal to 90 bar, from greater than or equal to 40 bar to less than or equal to 90 bar, from greater than or equal to 45 bar to less than or equal to 90 bar, from greater than or equal to 50 bar to less than or equal to 90 bar, from greater than or equal to 55 bar to less than or equal to 90 bar, from greater than or equal to 60 bar to less than or equal to 90 bar, from greater than or equal to 65 bar to less than or equal to 90 bar, from greater than or equal to 70 bar to less than or equal to 90 bar, from greater than or equal to 75 bar to less than or equal to 90 bar, from greater than or equal to 80 bar to less than or equal to 90 bar, or from greater than or equal to 85 bar to less than or equal to 90 bar. In one or more embodiments, the pressure is from greater than or equal to 20 bar to less than or equal to 85 bar, such as from greater than or equal to 20 bar to less than or equal to 80 bar, from greater than or equal to 20 bar to less than or equal to 75 bar, from greater than or equal to 20 bar to less than or equal to 70 bar, from greater than or equal to 20 bar to less than or equal to 65 bar, from greater than or equal to 20 bar to less than or equal to 60 bar, from greater than or equal to 20 bar to less than or equal to 55 bar, from greater than or equal to 20 bar to less than or equal to 50 bar, from greater than or equal to 20 bar to less than or equal to 45 bar, from greater than or equal to 20 bar to less than or equal to 40 bar, from greater than or equal to 20 bar to less than or equal to 35 bar, from greater than or equal to 20 bar to less than or equal to 30 bar, from greater than or equal to 20 bar to less than or equal to 25 bar. In one or more embodiments, the pressure is from greater than or equal to 25 bar to less than or equal to 85 bar, such as from greater than or equal to 30 bar to less than or equal to 80 bar, from greater than or equal to 35 bar to less than or equal to 75 bar, from greater than or equal to 40 bar to less than or equal to 70 bar, from greater than or equal to 45 bar to less than or equal to 65 bar, or from greater than or equal to 50 bar to less than or equal to 60 bar.

In one or more embodiments, the duration is from greater than or equal to 12 hours to less than or equal to 10 days, such as from greater than or equal to 1 day to less than or equal to 10 days, such as from greater than or equal to 12 hours to less than or equal to 9 days, from greater than or equal to 12 hours to less than or equal to 8 days, from greater than or equal to 12 hours to less than or equal to 7 days, from greater than or equal to 12 hours to less than or equal to 6 days, from greater than or equal to 12 hours to less than or equal to 5 days, from greater than or equal to 12 hours to less than or equal to 4 days, from greater than or equal to 12 hours to less than or equal to 3 days, from greater than or equal to 12 hours to less than or equal to 2 days, or from greater than or equal to 12 hours to less than or equal to 1 day. In one or more embodiments, the duration is from greater than or equal to 1 day to less than or equal to 10 days, such as from greater than or equal to 2 days to less than or equal to 10 days, from greater than or equal to 3 days to less than or equal to 10 days, from greater than or equal to 4 days to less than or equal to 10 days, from greater than or equal to 5 days to less than or equal to 10 days, from greater than or equal to 6 days to less than or equal to 10 days, from greater than or equal to 7 days to less than or equal to 10 days, from greater than or equal to 8 days to less than or equal to 10 days, or from greater than or equal to 9 days to less than or equal to 10 days. In one or more embodiments, the duration is from greater than or equal to 1 day to less than or equal to 9 days, such as from greater than or equal to 2 days to less than or equal to 8 days, from greater than or equal to 3 days to less than or equal to 7 days, or from greater than or equal to 4 days to less than or equal to 6 days.

According to embodiments, the methods for forming black $TiO_2$ particles with an disordered $TiO_2$ shell and a crystalline $TiO_2$ core comprises exposing white $TiO_2$ to $NaBH_4$ at temperatures from greater than or equal to 250° C. to less than or equal to 400° C. at atmospheric pressure, and for durations from greater than or equal to 0.5 hours to less than or equal to 48 hours.

In one or more embodiments, the temperature is from greater than or equal to 250° C. to less than or equal to 400° C., such as from greater than or equal to 275° C. to less than or equal to 400° C., from greater than or equal to 300° C. to less than or equal to 400° C., from greater than or equal to 325° C. to less than or equal to 400° C., from greater than or equal to 350° C. to less than or equal to 400° C., OR from greater than or equal to 375° C. to less than or equal to 400° C. In one or more embodiments, the temperature is from greater than or equal to 250° C. to less than or equal to 375° C., from greater than or equal to 250° C. to less than or equal to 350° C., from greater than or equal to 250° C. to less than or equal to 325° C., from greater than or equal to 250° C. to less than or equal to 300° C., or from greater than or equal to 250° C. to less than or equal to 275° C. In one or more embodiments, the temperature is from greater than or equal to 275° C. to less than or equal to 375° C., such as from greater than or equal to 300° C. to less than or equal to 350° C.

In one or more embodiments, the duration is from greater than or equal to 0.5 hours to less than or equal to 48 hours, such as from greater than or equal to 2 hour to less than or equal to 48 hours, from greater than or equal to 5 hours to less than or equal to 48 hours, from greater than or equal to 7 hours to less than or equal to 48 hours, from greater than or equal to 10 hours to less than or equal to 48 hours, from greater than or equal to 12 hours to less than or equal to 48 hours, from greater than or equal to 15 hours to less than or equal to 48 hours, from greater than or equal to 17 hours to less than or equal to 48 hours, from greater than or equal to 20 hours to less than or equal to 48 hours, from greater than or equal to 22 hours to less than or equal to 48 hours, from greater than or equal to 25 hours to less than or equal to 48 hours, from greater than or equal to 27 hours to less than or equal to 48 hours, from greater than or equal to 30 hours to less than or equal to 48 hours, from greater than or equal to 32 hours to less than or equal to 48 hours, from greater than or equal to 35 hours to less than or equal to 48 hours, from greater than or equal to 37 hours to less than or equal to 48 hours, from greater than or equal to 40 hours to less than or equal to 48 hours, from greater than or equal to 42 hours to less than or equal to 48 hours, or from greater than or equal to 45 hours to less than or equal to 48 hours. In one or more embodiments the duration is from greater than or equal to 0.5 hours to less than or equal to 45 hours, such as from greater than or equal to 0.5 hours to less than or equal to 42 hours, from greater than or equal to 0.5 hours to less than or equal to 40 hours, from greater than or equal to 0.5 hours to less than or equal to 37 hours, from greater than or equal to 0.5 hours to less than or equal to 35 hours, from greater than or equal to 0.5 hours to less than or equal to 32 hours, from greater than or equal to 0.5 hours to less than or equal to 30 hours, from greater than or equal to 0.5 hours to less than or equal to 27 hours, from greater than or equal to 0.5 hours to less than or equal to 25 hours, from greater than or equal to 0.5 hours to less than or equal to 22 hours, from greater than or equal to 0.5 hours to less than or equal to 20 hours, from greater than or equal to 0.5 hours to less than or equal to 17 hours, from greater than or equal to 0.5 hours to less than or equal to 15 hour, from greater than or equal to 0.5 hours to less than or equal to 12 hours, from greater than or equal to 0.5 hours to less than or equal to 10 hours, from greater than or equal to 0.5 hours to less than or equal to 7 hours, from greater than or equal to 0.5 hours to less than or equal to 5 hours, or from greater than or equal to 0.5 hours to less than or equal to 2 hours. In one or more embodiments, the duration is from greater than or equal to 2 hour to less than or equal to 45 hours, such as from greater than or equal to 5 hours to less than or equal to 42 hours, from greater than or equal to 7 hours to less than or equal to 40 hours, from greater than or equal to 10 hours to less than or equal to 37 hours, from greater than or equal to 12 hours to less than or equal to 35 hours, from greater than or equal to 15 hours to less than or equal to 32 hours, from greater than or equal to 18 hours to less than or equal to 30 hours, or from greater than or equal to 20 hours to less than or equal to 28 hours.

In one or more embodiments, a ratio of $TiO_2$ to $NaBH_4$ is from greater than or equal to 1.0:1.0 to less than or equal to 5.0:1.0, such as from greater than or equal to 1.5:1.0 to less than or equal to 5.0:1.0, from greater than or equal to 2.0:1.0 to less than or equal to 5.0:1.0, from greater than or equal to 2.5:1.0 to less than or equal to 5.0:1.0, from greater than or equal to 3.0:1.0 to less than or equal to 5.0:1.0, from greater than or equal to 3.5:1.0 to less than or equal to 5.0:1.0, from greater than or equal to 4.0:1.0 to less than or equal to 5.0:1.0, or from greater than or equal to 4.5:1.0 to less than or equal to 5.0:1.0. In one or more embodiments, a ratio of $TiO_2$ to $NaBH_4$ is from greater than or equal to 1.0:1.0 to less than or equal to 4.5:1.0, such as from greater than or equal to 1.0:1.0 to less than or equal to 4.0:1.0, from greater than or equal to 1.0:1.0 to less than or equal to 3.5:1.0, from greater than or equal to 1.0:1.0 to less than or equal to 3.0:1.0, from greater than or equal to 1.0:1.0 to less than or equal to 2.5:1.0, from greater than or equal to 1.0:1.0 to less than or equal to 2.0:1.0, from greater than or equal to 1.0:1.0 to less than or equal to 1.5:1.0. In one or more embodiments, a ratio of $TiO_2$ to $NaBH_4$ is from greater than or equal to 1.5:1.0 to less than or equal to 4.5:1.0, such as from greater than or equal to 2.0:1.0 to less than or equal to 4.0:1.0, or from greater than or equal to 2.5:1.0 to less than or equal to 3.5:1.0.

In an embodiment, black $TiO_2$ according to embodiments is formed by exposing white $TiO_2$ to $NaBH_4$ at a ratio of $TiO_2$ to $NaBH_4$ from greater than or equal to 3.0:1.0 to less than or equal to 4.5:1.0 at a temperature from greater than or equal to 250° C. to less than or equal to 300° C. for a duration from greater than or equal to 1 hour to less than or equal to 14 hours at atmospheric pressure.

Figure 4:
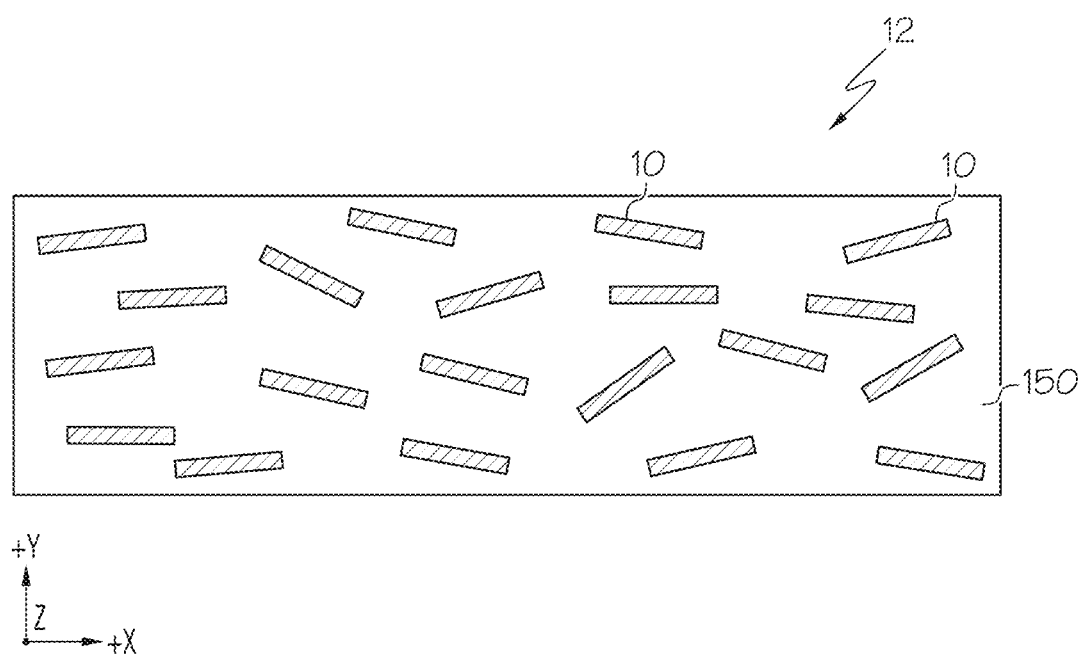
FIG. 4 schematically depicts a cross sectional view of a LiDAR reflecting dark colored paint layer on an article according to one or more embodiments disclosed and described herein.

Referring now to FIG. 4, an embodiment of a LiDAR reflecting dark colored layer 12 (e.g., a paint layer) with a plurality of black $TiO_2$ particles 10 according to embodiments disclosed and described herein is depicted. Particularly, the LiDAR reflecting dark colored layer 12 includes a plurality of black $TiO_2$ particles 10 according to embodiments disclosed and described herein disposed in a binder 150 (e.g., a paint binder). Non-limiting examples of binders including enamel paint binders, urethane paint binders, and combination enamel-urethane paint binders. The LiDAR reflecting dark colored layer 12 appears as a dark color to an observer viewing the LiDAR reflecting dark colored layer 12 and reflects near-IR and LiDAR electromagnetic radiation with a wavelength of, for example, 905 nm or 1550 nm. That is, the LiDAR reflecting dark colored layer 12 exposed to sunlight and viewed by an observer has a color with a lightness in CIELAB color space of less than or equal to 20 and reflects an average of more than 20% of near-IR and LiDAR electromagnetic radiation with a wavelength of 905 nm or 1550 nm. In embodiments, the LiDAR reflecting dark colored layer 12 exposed to sunlight reflects an average of less than 10% of electromagnetic radiation in the visible spectrum and has a lightness in CIELAB color space of less than or equal to 15. In such embodiments, the LiDAR reflecting dark colored layer 12 exposed to sunlight may have a lightness in CIELAB color space of less than or equal to 10. As used herein, the term "average" refers to an average of ten (10) reflectance values equally distanced apart along a specified reflectance spectrum for a LiDAR reflecting dark colored pigment or LiDAR reflecting dark colored layer described herein. Also, the terms "reflects more than" and "reflects less than" as used herein refers to "reflects an average of more than" and "reflects an average or less than", respectively, unless otherwise stated.

Figure 5:
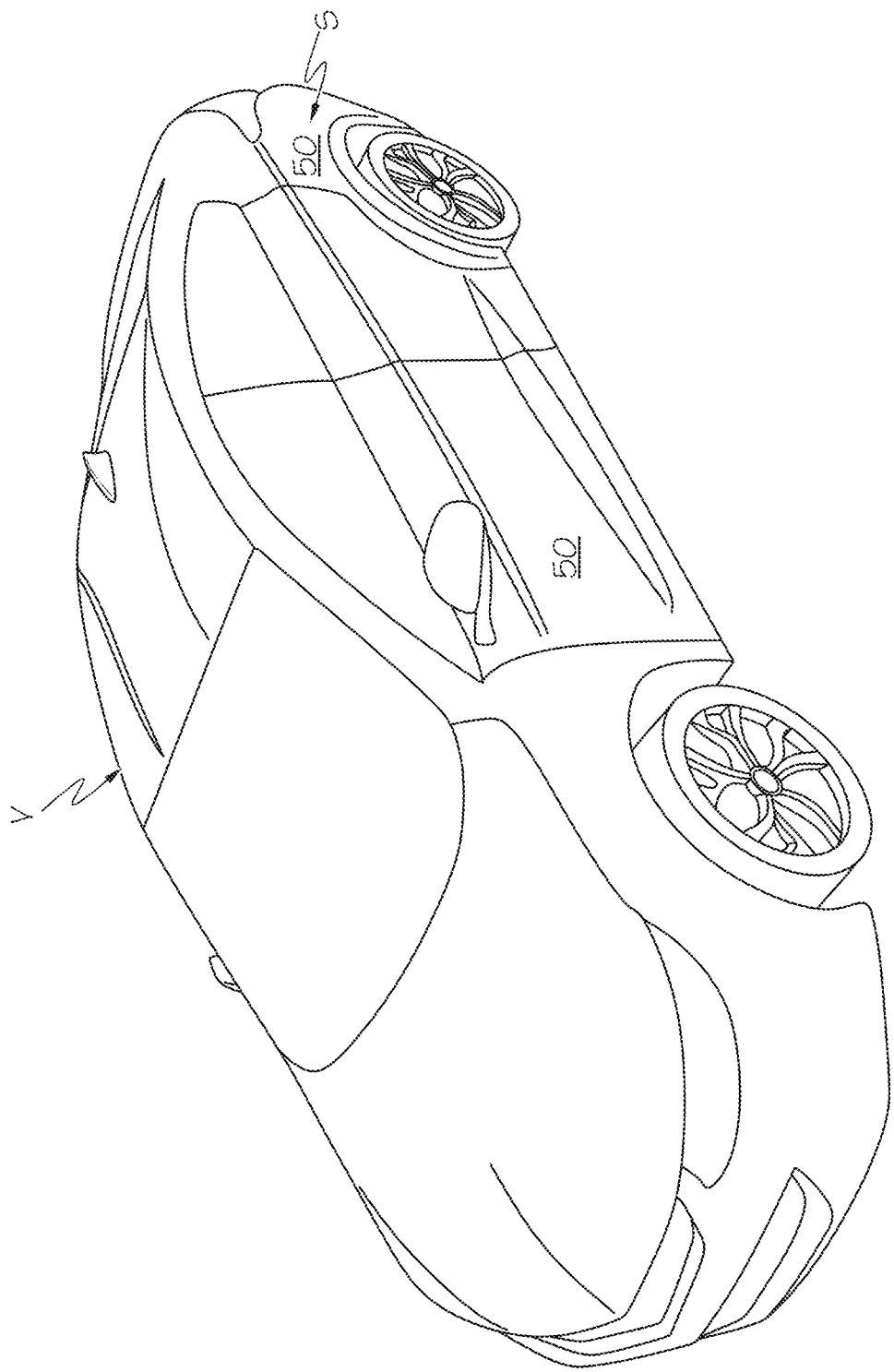
FIG. 5 schematically depicts a vehicle with side panels painted with a LiDAR reflecting dark colored paint according to one or more embodiments disclosed and described herein.
Figure 6:
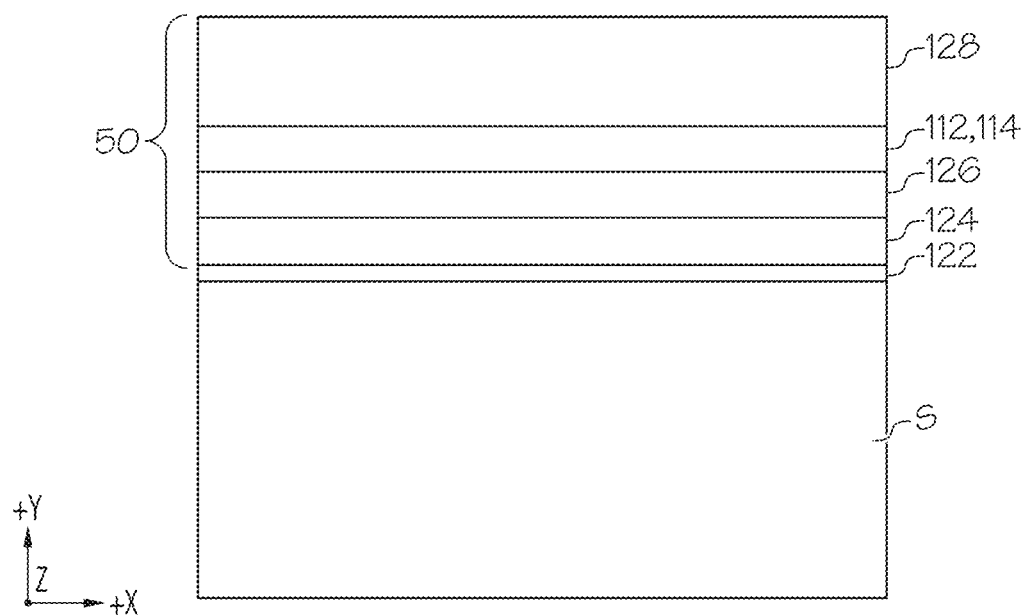
FIG. 6 schematically depicts a cross sectional view of a side panel painted with the LiDAR reflecting dark colored paint in FIG. 5.

Referring now to FIGS. 5 and 6, embodiments of a vehicle 'V' painted with a LiDAR reflecting dark colored paint are depicted. Particularly, FIG. 5 depicts the vehicle V with a side panel 'S' coated with a LiDAR reflecting dark colored paint 50 and FIG. 6 depicts a cross section of one of the side panel S with the LiDAR reflecting dark colored paint 50. The LiDAR reflecting dark colored paint 50 may include a plurality of layers that provide surface protection and a desired color. For example, the LiDAR reflecting dark colored paint 50 may include a phosphate layer 122, an electrocoating layer 124, a primer layer 126, a color layer 112 or a color layer 114 (also known as a basecoat or basecoat layer) and a clear coat layer 128. Non-limiting examples of a phosphate layer include a manganese phosphate layer, an iron phosphate layer, a zinc phosphate layer, and combinations thereof. Non-limiting examples of an electrocoating layer include an anodic electrocoating layer and a cathodic electrocoating layer. Non-limiting examples of a primer layer include an epoxy primer layer and a urethane primer layer. Non-limiting examples of a clear coat layer include a urethane clear coat layer and an acrylic lacquer clear coat layer. It should be understood that the LiDAR reflecting dark colored paint 50 appears as a dark color to an observer viewing the LiDAR reflecting dark paint and reflects near-IR and LiDAR electromagnetic radiation with a wavelength of 905 nm or 1550 nm. That is, the LiDAR reflecting dark colored paint 50 exposed to sunlight and viewed by an observer has a color with lightness in CIELAB color space of less than or equal to 20 and reflects more than 40% of near-IR or LiDAR electromagnetic radiation with a wavelength of 905 nm or 1550 nm. In some embodiments, the LiDAR reflecting dark colored paint 50 exposed to sunlight reflects an average of less than 10% of electromagnetic radiation in the visible spectrum and has a lightness in CIELAB color space of less than or equal to 15. In such embodiments, the LiDAR reflecting dark colored paint 50 exposed to sunlight may have a lightness in CIELAB color space of less than or equal to 10.

As noted above LiDAR reflecting black $TiO_2$ particles according to embodiments disclosed and described herein may be used in paint to provide LiDAR reflecting dark colored articles that can be detected with LiDAR systems using near-IR or LiDAR electromagnetic radiation, such as with a wavelength of 905 nm or 1550 nm. That is, articles desired to be detected by LiDAR systems such as automobiles, motorcycles, bicycles, and the like, may be painted with a LiDAR reflecting dark colored paint described herein and thereby provide a dark colored article a desired ark color and yet be detectable by a LiDAR system using near-IR electromagnetic radiation, such as with a wavelength of 905 nm or 1550 nm.

EXAMPLES

Embodiments will be further clarified by the following examples.

Example 1

Three samples were prepared as follows. Sample 1 was commercially available white $TiO_2$. Sample 2 was prepared by exposing commercially available white $TiO_2$ to $NaBH_4$ at a $TiO_2$ to $NaBH_4$ of 4.0:1.0. The $TiO_2$ was exposed to $NaBH_4$ at 375° C. and atmospheric pressure for 1 hour. Sample 3 was prepared by exposing commercially available $TiO_2$ to a hydrogen atmosphere at a temperature of 250° C. and a pressure of 20 bar for 5 days.

Figure 7A:
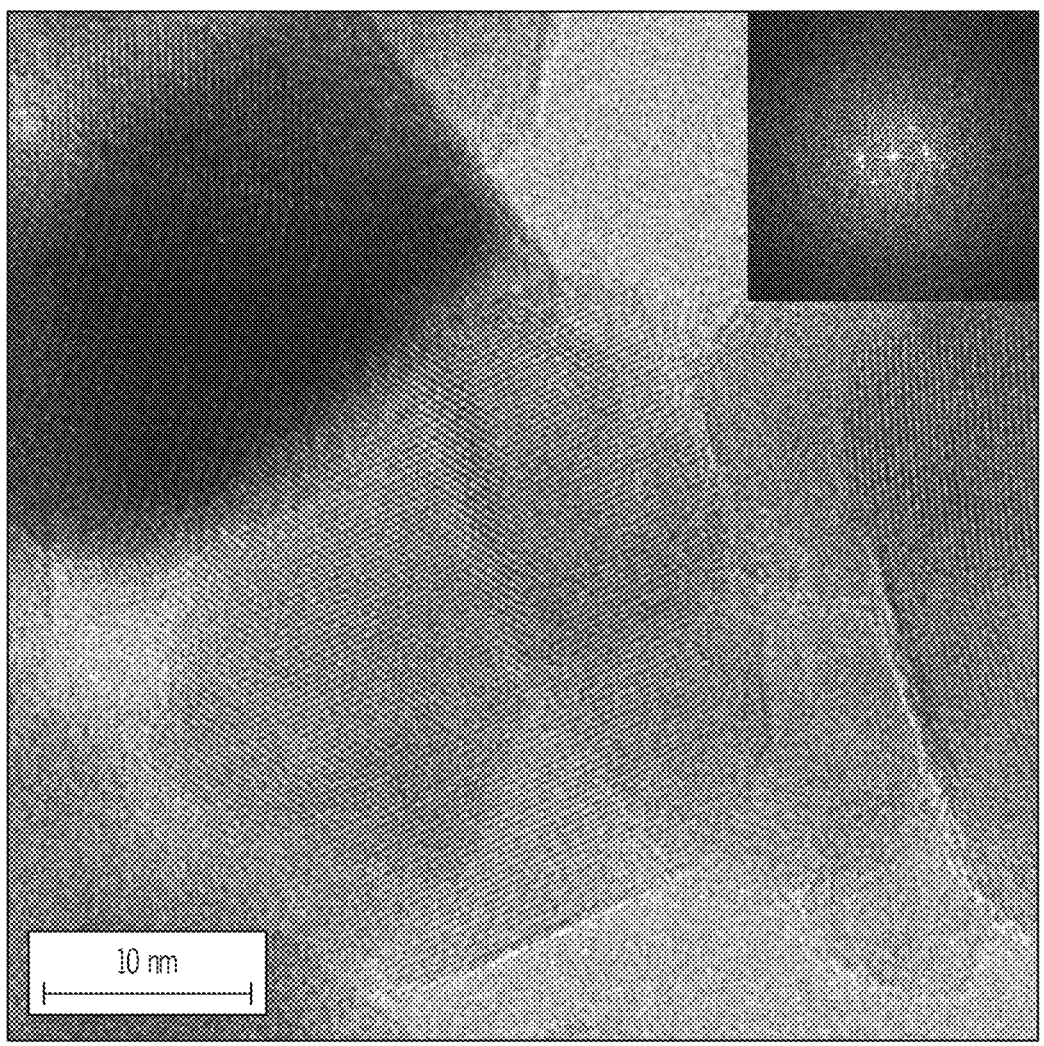
FIGS. 7A-7C are scanning electron microscope (SEM) images of $TiO_2$ samples with reflectivity of near-IR for the sample shown in the inlay.
Figure 8A:
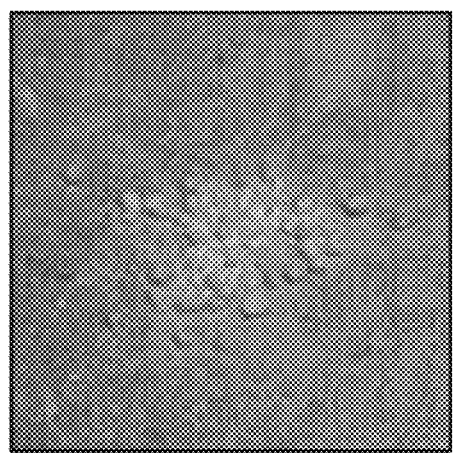
FIGS. 8A-8C are photographs showing the color of $TiO_2$ samples.

FIG. 7A is a scanning electron microscope (SEM) image of Sample 1 showing white $TiO_2$ particles that are crystalline $TiO_2$. The inset in FIG. 7A is the reflectivity of Sample 1 for near-IR electromagnetic radiation. As can be seen in the image, no core shell structure has been formed, and Sample 1 is a good reflector of near-IR electromagnetic radiation. FIG. 8A shows that Sample 1 has a very light, white color.

Figure 7B:
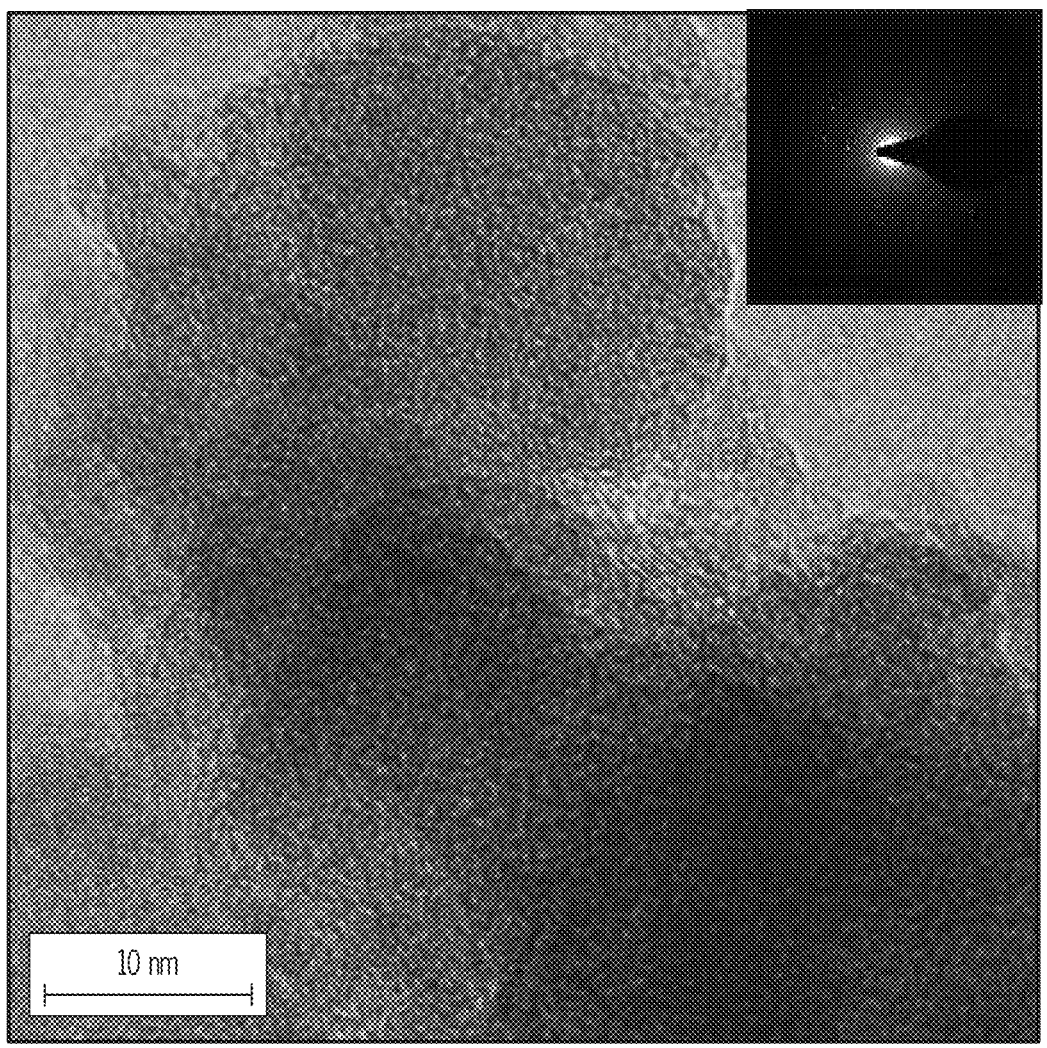
Figure 8B:
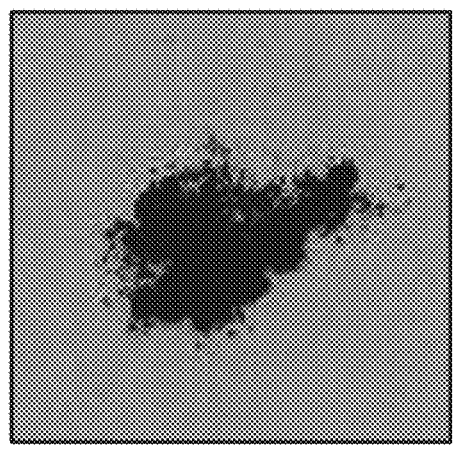
Figure 8C:
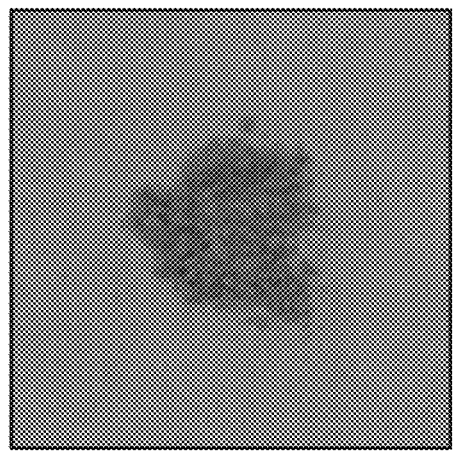

FIG. 7B is an SEM image of Sample 2 showing that the $TiO_2$ particles transitioned to being entirely amorphous. The inset in FIG. 7B is the reflectivity of Sample 2 for near-IR electromagnetic radiation. As can be seen in the image, no core shell structure has been formed, and Sample 2 does not reflect near-IR electromagnetic radiation. FIG. 8B shows that Sample 2 has a very black color.

Figure 7C:
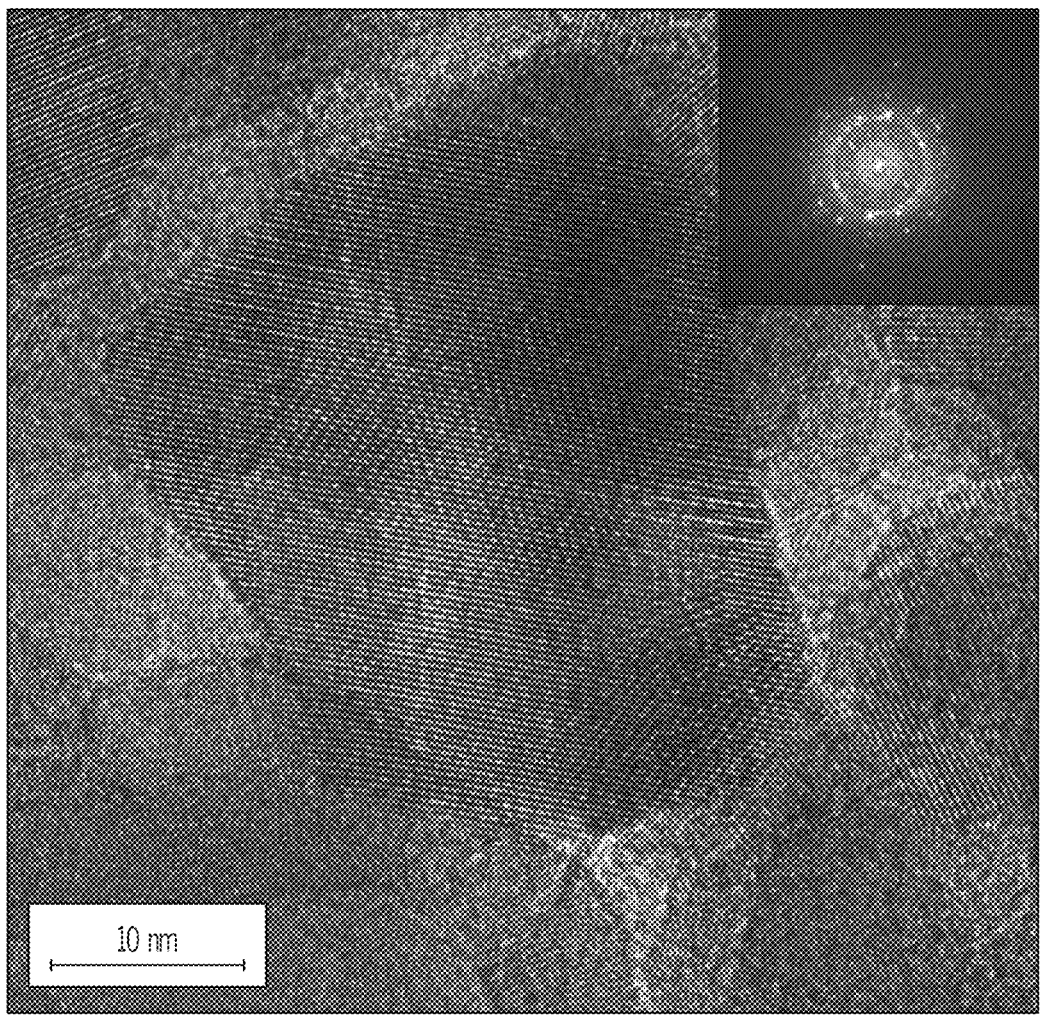

FIG. 7C is an SEM image of Sample 3 showing that the $TiO_2$ particles formed a disordered shell encompassing a core of crystalline $TiO_2$. The inset in FIG. 7C is the reflectivity of Sample 3 for near-IR electromagnetic radiation. Sample 3 is a good reflector of near-IR electromagnetic radiation. FIG. 8B shows that Sample 3 has a greyish color.

Example 2

Figure 9:
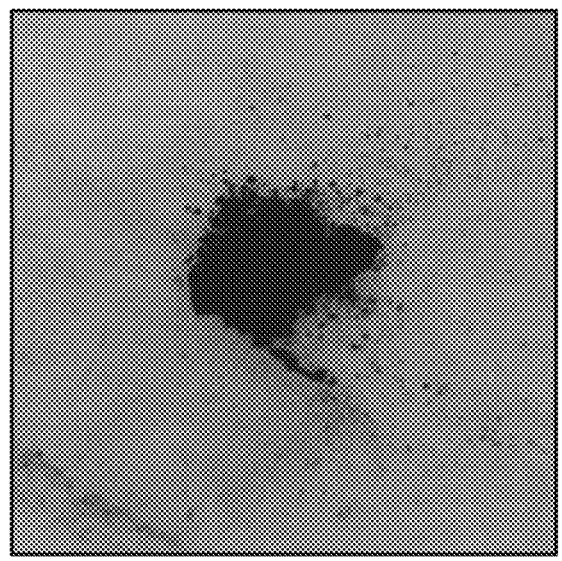
FIG. 9 is a photograph of black $TiO_2$ powder according to embodiments disclosed and described herein.
Figure 10:
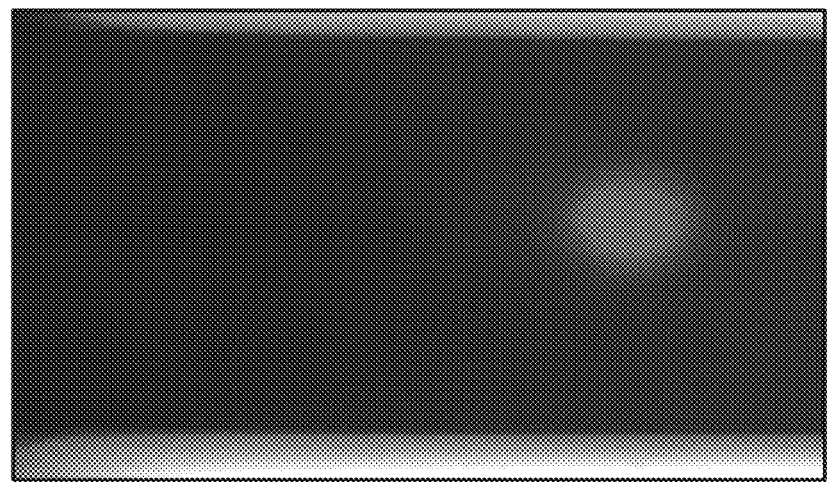
FIG. 10 is a photograph showing the near-IR reflectivity of black $TiO_2$ powder according to embodiments disclosed and described herein.

A sample was prepared by exposing the commercially available white $TiO_2$ from Example 1 to $NaBH_4$ at a $TiO_2$ to $NaBH_4$ ratio of 4.0:1.0 at atmospheric pressure and a temperature of 275° C. for a duration of 12 hours. As shown in FIG. 9, this sample had a good black color with a slight blue. FIG. 10 is photograph of the sample using a camera that detects near-IR reflectivity and shows that the sample is good at reflecting near-IR electromagnetic radiation.

Directional terms as used herein—for example up, down, right, left, front, back, top, bottom, vertical, horizontal—are made only with reference to the figures as drawn and are not intended to imply absolute orientation unless otherwise expressly stated. The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. In general, any quantitative comparison, value, measurement, or other representation is "about" or "approximate" whether or not expressly stated to be such. Also, start points and endpoints of ranges are disclosed herein and it is contemplated that any single start point can be used in conjunction with any given endpoint and the ranges include the start and endpoints unless otherwise noted. For example, the range "greater than or equal to 50 nm, 75 nm, 100 nm, 125 nm, 150 nm or 175 nm, and less than or equal to 200 nm, 175 nm, 150 nm, 125 nm, 100 nm, or 75 nm" includes any combination of the start points between and including 50 nm, 75 nm, 100 nm, 125 nm, 150 nm or 175 nm and the end points between and including 200 nm, 175 nm, 150 nm, 125 nm, 100 nm, or 75 nm, so long and as the end point is greater than the start part.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. Black titanium dioxide comprising:
   a crystalline titanium dioxide core; and
   an amorphous titanium dioxide shell that encompasses the crystalline titanium dioxide core, wherein
   the black titanium dioxide has a reflectivity of electromagnetic radiation in the visible spectrum that is less than or equal to 15% and a reflectivity for near-IR and LiDAR electromagnetic radiation that is greater than or equal to 10%.

2. The black titanium dioxide of claim 1, wherein the black titanium dioxide has a reflectivity of electromagnetic radiation in the visible spectrum that is less than or equal to 5%.

3. The black titanium dioxide of claim 1, wherein the black titanium dioxide has a reflectivity for near-IR and LiDAR electromagnetic radiation that is greater than or equal to 20%.

4. The black titanium dioxide of claim 1, wherein the black titanium dioxide has a reflectivity for electromagnetic radiation in the visible spectrum that is from greater than or equal to 0.5% to less than or equal to 5%.

5. The black titanium dioxide of claim 1, wherein the black titanium dioxide has a reflectivity for near-IR and LiDAR electromagnetic radiation that is from greater than or equal to 15% to less than or equal to 65%.

6. The black titanium dioxide of claim 1, wherein the black titanium dioxide has a band gap from greater than or equal to 1.0 eV to less than or equal to 2.0 eV.

7. The black titanium dioxide of claim 1, wherein the black titanium dioxide has a band gap from greater than or equal to 1.2 eV to less than or equal to 1.8 eV.

8. Black titanium dioxide particles comprising:
   a crystalline titanium dioxide core; and
   an amorphous titanium dioxide shell that encompasses the crystalline titanium dioxide core, wherein
   the black titanium dioxide particle has a band gap from greater than or equal to 1.0 eV to less than or equal to 2.0 eV, and
   the black titanium dioxide particles have a reflectivity of electromagnetic radiation in the visible spectrum that is less than or equal to 15% and a reflectivity for near-IR and LiDAR electromagnetic radiation that is greater than or equal to 10%.

9. The black titanium dioxide particles of claim 8, wherein the black titanium dioxide particles have a band gap from greater than or equal to 1.2 eV to less than or equal to 1.8 eV.

10. The black titanium dioxide particles of claim 8, wherein the amorphous titanium dioxide shell has a thickness less than or equal to 5.0 nm.

11. The black titanium dioxide particles of claim 8, wherein the amorphous titanium dioxide shell has a thickness less than or equal to 2.5 nm.

12. The black titanium dioxide particles of claim 8, wherein the amorphous titanium dioxide shell has a thickness from greater than or equal to 0.1 nm to less than or equal to 5.0 nm.

13. The black titanium dioxide particles of claim 8, wherein the black titanium dioxide particles have an average particle size $D_{50}$ that is from greater than or equal to 5 nm to less than or equal to 200 nm.

14. The black titanium dioxide particles of claim 8, wherein the black titanium dioxide particles have a reflectivity of electromagnetic radiation in the visible spectrum that is less than or equal to 5% and a reflectivity for near-IR and LiDAR electromagnetic radiation that is greater than or equal to 20%.

15. A paint comprising:
    a paint binder;
    black titanium dioxide comprising:
       a crystalline titanium dioxide core; and
       an amorphous titanium dioxide shell that encompasses the crystalline titanium dioxide core, wherein
       the black titanium dioxide has a reflectivity of electromagnetic radiation in the visible spectrum that is less than or equal to 15% and a reflectivity for near-IR and LiDAR electromagnetic radiation that is greater than or equal to 10%, wherein
    the LiDAR reflecting dark colored paint has a color with a lightness in CIELAB color space less than or equal to 40.

16. The paint of claim 15, wherein the black titanium dioxide has a band gap from greater than or equal to 1.0 eV to less than or equal to 2.0 eV.

17. The paint of claim 15, wherein the amorphous titanium dioxide shell has a thickness less than or equal to 5 nm.

18. A vehicle comprising:
    a body panel coated in a LiDAR reflecting dark colored paint, the LiDAR reflecting dark colored paint comprising:
       a paint binder;
       black titanium dioxide comprising:
          a crystalline titanium dioxide core; and
          an amorphous titanium dioxide shell that encompasses the crystalline titanium dioxide core, wherein
          the black titanium dioxide has a reflectivity of electromagnetic radiation in the visible spectrum that is less than or equal to 15% and a reflectivity for near-IR and LiDAR electromagnetic radiation that is greater than or equal to 10%, wherein
    the LiDAR reflecting dark colored paint has a color with a lightness in CIELAB color space less than or equal to 40.

19. The vehicle of claim 18, wherein black titanium dioxide has a band gap from greater than or equal to 1.0 eV to less than or equal to 2.0 eV.

* * * * *